US006906810B2

United States Patent
Senay et al.

(10) Patent No.: US 6,906,810 B2
(45) Date of Patent: *Jun. 14, 2005

(54) METHOD AND SYSTEM FOR ALLOWING AN ON-LINE USER TO SELECTIVELY CUSTOMIZE A DOCUMENT FOR PRINTING IN A SINGLE BATCH PROCESS

(75) Inventors: Hikmet Senay, Ossining, NY (US); Peter A. Hofmann, North Salem, NY (US); Pawel Potocki, Ossining, NY (US)

(73) Assignee: Morgan Guaranty Trust Company, New York, NY (US)

( * ) Notice: Subject to any disclaimer, the term of this patent is extended or adjusted under 35 U.S.C. 154(b) by 906 days.

This patent is subject to a terminal disclaimer.

(21) Appl. No.: 09/875,657

(22) Filed: Jun. 6, 2001

(65) Prior Publication Data

US 2002/0018221 A1 Feb. 14, 2002

Related U.S. Application Data

(60) Provisional application No. 60/217,960, filed on Jul. 13, 2000.

(51) Int. Cl.[7] .............................................. G06H 15/00
(52) U.S. Cl. ...................................... 358/1.1; 358/1.18
(58) Field of Search ............................... 358/101, 1.18, 358/460, 452, 1.17; 707/102; 345/418, 661, 666, 676, 677, 678, 680, 681, 682

(56) References Cited

U.S. PATENT DOCUMENTS 5,420,694 A * 5/1995 Matsumoto .................. 358/462
2002/0018221 A1 * 2/2002 Senay et al. ................. 358/1.1

* cited by examiner

*Primary Examiner*—Arthur G. Evans
(74) *Attorney, Agent, or Firm*—Milbank, Tweed, Hadley & McCloy LLP

(57) ABSTRACT

Methods and system for allowing a user, through a user computer in telecommunication link with a system having access to electronic documents, to select pages of an electronic document for printing in a single batch process are provided. One method includes providing a user interface having a first user selectable element and a second user selectable element; displaying to the user, through the user interface, the pages of an electronic document; allowing the user, via the first user selectable element, to select individual pages of the document desired for printing in a single batch process; storing the user selected page information in response to user activation of the first user selectable element; allowing the user, via the second user selectable element, to print in a single batch process the pages of the document that the user has selected for printing in a single batch process; and retrieving, in response to user activation of the second user selectable element, the stored user selected pages information for printing of those pages of the document selected by the user.

23 Claims, 25 Drawing Sheets

FIG.3a

| JPMorgan www.jpmorgan.com | Investor relations |

1999 Annual report

ⓐ Jump to a section

Letter to shareholders

Other links

Financial highlights

Disclosure on
forward-looking
statements

Douglas A. Warner III,
Chairman and
Chiefs Executive Officer

Dear fellow shareholders:

Nineteen ninety-nine was a strong year for J.P. Morgan. We made good progress on our strategic agenda by focusing on growth in our client activities, risk reduction...

FIG.3c

| JPMorgan www.jpmorgan.com | Investor relations |
|---|---|
| 1999 Annual report | |

⊙ Jump to a section

Letter to shareholders

Other links

Financial highlights
Disclosure on
forward–looking
statements

Financial highlights

| Dollars in millions, except per share data | 1999 | 1998 | 1997 |
|---|---|---|---|
| Total revenues | $8,856 | $6,955 | $7,220 |
| Pretax income | 3,114 | 1,417 | 2,154 |

. . . .

⊙ Jump to a section  ⊙ Go to top

| Downloadable files | AR home | AR site map | Contact us |

FIG.3d

| JPMorgan www.jpmorgan.com | Investor relations |
|---|---|
| 1999 Annual report | |

◎ Jump to a section

Voices and views

Contents
Solutions
Notes from conversations
Accomplishment
Ideas
Access

The choice is simple:
Invent and reinvent yourself of become extinct.

"Having more information means you actually have even greater need for good advice—for a pathfinder through the jungle of information."

"information is a democratizing force but it creates anxiety and urgent demands for perspective............"

◎ Jump to a section  ◎ Go to top

| Downloadable files | AR home | AR site map | Contact us |
|---|---|---|---|

FIG.3e

| JPMorgan www.jpmorgan.com | Investor relations |

1999 Annual report

Ⓐ Jump to a section

Review and outlook

We made substantial progress on our strategic initiatives in 1999 as we focused on generated revenues, risk reduction, and productivity. Results for the years were................

Other links

Disclosure on
forward-looking
statements

FIG.3f

| JPMorgan  www.jpmorgan.com | Investor relations |
|---|---|
| 1999 Annual report | |

ⓐ Jump to a section

Contents

Investment Banking

Equity Investment
Equities

Interest Rate and
FX Markets

Credit Markets and
Credit Portfolio

Proprietary Investing
and Trading

Asset Management
Services

Corporate

Other links

Disclosure on
forward-looking
statements

Investment Banking

Investment Banking results in 1999 —— market share, gains, record revenues, more clients, and significant contribution to the firm's EVA —— reflects the breadth..............

FIG.3g

| JPMorgan www.jpmorgan.com | Investor relations |
|---|---|
| 1999 Annual report | |

⊙ Jump to a section

Responsibility for financial and Report of
Independent accountants

Consolidated statement of income (Interactive)
Includes a charting feature that allows you to analyze the composition of
revenues, expenses, and income.

Consolidated balance sheet (Interactive)

. . . .

| ⊙ Jump to a section | ⊙ Go to top | |
|---|---|---|
| Downloadable files | AR home | AR site map | Contact us |

FIG.3h

| JPMorgan  www.jpmorgan.com | Investor relations |
|---|---|
| 1999 Annual report | |

◎ Jump to a section

Consolidated statement of income

J.P.Morgan & Incorporated

◎ Graph data by region  ◎ Graph data by segment  ◎ View % change

In millions, except share data

| | Go to note | 1999 | 1998 |
|---|---|---|---|
| Net interest revenue | | | |
| Interest revenue | 6 | $10,970 | $12,641 |
| Interest expense | 6 | 9,429 | 11,360 |

FIG.3i

| JPMorgan  www.jpmorgan.com | Investor relations |
|---|---|
| 1999 Annual report | |

Ⓐ Jump to a section

Ⓐ Jump to a note

1. Summary of significant accounting policies
J.P.Morgan & Co. Incorporated (J.P.Morgan) is the holding company for a group of subsidiaries that provides a wide range of financial services.

We serve a broad client base that includes corporations, governments, institutions, and individuals. We also enter into transactions for our own account.

![Browser window screenshot showing jpmorgan.com/annual Letter to shareholders page in Netscape]

Window title: jpmorgan.com/annual: Letter to shareholders: – Netscape

Menu: File Edit View Go Communicator Help

Toolbar: Back Forward Reload Home Search Netscape Print Security Stop

Bookmarks Netsite:

JPMorgan www.jpmorgan.com | Investor relations | What's Related

1999 Annual report

⊕ Jump to a section

Letter to shareholders

Other links

Financial highlights
Disclosure on forward-looking statements

My custom report  ⊕ Add this page  ⓟ View/Print  ⓘ Help
                      210              230        220

200

Douglas A. Warner III,
Chairman and
Chief Executive Officer

Dear fellow shareholders:

Nineteen ninety-nine was a strong year for J.P. Morgan. We made good progress on our strategic agenda by focusing on growth in our client activities, risk reduction...

Document: Done

FIG.5 jpmorgan.com/annual:Custom report: Current selections - Netscape

File Edit View Go Communicator Help

Back Forward Reload Home Search Netscape Print Security Stop

Bookmarks Netsite:

JPMorgan www.jpmorgan.com | Investor relations
1999 Annual report

What's Related

⊙ Jump to a section

My custom report
Selections from J.P. Morgan's Annual Report
330 — ⊙ Create report Include? View Current selections
310  320
 ⊙  △  Letter to shareholders
         Letter
 ⊙  △  MD&A: Business segment results
 ⊙  △  Investment Banking
 ⊙  △  Discussion and summary of results
         Summary of results: Quarterly trend
         Total revenue growth: Chart
 ⊙  △  Consolidated financial statements
         Consolidated statement of income
         Consolidated statement of income by segment: Chart View 1
 ⊙  △  Notes to consolidated financial statements
         3.Business segments ⊙ Jump to a section  ⊙ Go to top
Downloadable files | AR home | AR site map            Contact us Document: Done

FIG.6a

Letter to shareholders

Douglas A. Warner III,
Chairman and
Chief Executive Officer

Dear fellow shareholders:

Nineteen ninety-nine was a strong year for J.P. Morgan. We made good progress on our strategic agenda by focusing on growth in our client activities, risk reduction...

FIG.6b

Management discussion & analysis: Business segment results:

Investment Banking

Investment Banking results in 1999 -- market share gains, record revenues, more clients, and significant contribution to the firm's EVA -- reflects the breadth and strength of ..............

In 1999 our mix also became more diversified by region. Growth in the European market led to significant revenue gains as a result of our strong ..............

FIG.6c

Management discussion & analysis: Business segment results:

Investment Banking

In underwriting we also recorded market share gains. In equities we were one of the few lead managers to increase market share in the United States in 1999. Our market share in high-yield financial also advanced over the ..............

FIG.6d

Consolidated financial statement
Consolidated statement of income
J.P.Morgan & Incorporated

| In millions, except share data | 1999 | 1998 | 1997 |
|---|---|---|---|
| Net interest revenue | | | |
| Interest revenue | $10,970 | $12,641 | $12,353 |
| Interest expense | 9,429 | 11,360 | 10,481 |
| . . . . . . | | | |

FIG.6e

Notes consolidated financial statements:
3. Business segments

Operating segments are defined as components of an enterprise about which separate financial information is available that is evaluated regularly by the chief operating decision maker, or decision Making group, in assessing performance. In accordance with SFAS No. 131, we have presented results..............

Notes consolidated financial statements:
3. Business segments

FIG.6f

| In millions | Invest-ment Banking | Equity Invest-ment | Equity Markets | Interest Rate and Foreign Exchange Markets | Credit Markets | Credit Portfolio | Proprietary Investing and Trading | Asset Management Services | Corporate | Consol-idated |
|---|---|---|---|---|---|---|---|---|---|---|
| 1999 Net Iterest revenues | $ 6 | ($ 11) | $ 118 | $ 428 | $ 287 | $ 562 (2) | $ 205 (5) | $ 105 | $ 16 | $1,716 |
| Trading revenues | 232 | — | 615 | 1,246 | 785 | 188 | $ 205 | (41) | 48 | 3,115 |
| Advisory and underwriting fees | 971 | 6 | 173 | 61 | 387 | 2 | $ 205 | — | (5) | 1,630 |
| Investment memegement fees | — | 15 | — | — | — | — | $ 205 | — | (6) | 1,035 |

Notes consolidated financial statements:
3. Business segments (2) The adjustment to gross up Credit Portfolio revenue to a taxable basis was $27 in million 1999, $26 million in 1998 and $24 million in 1997. These amounts are eliminated in consolidation.

(3) Revenue form our credit investment securities portfolio were ($14 million) in 1999,($129 million) in 1998 and $45 million in 1997.
revenues from our proprietary emerging markets portfolio were ($80 million) in 1998 and $22 million in 1997. Expenses for this portfolios were not significant.

(4) Includes $35 million of gain related to the sale of investment securities to Interest Rate Markets

. . . . . . .

METHOD AND SYSTEM FOR ALLOWING AN ON-LINE USER TO SELECTIVELY CUSTOMIZE A DOCUMENT FOR PRINTING IN A SINGLE BATCH PROCESS

RELATED U.S. APPLICATION DATA

This non-provisional application claims priority from a provisional application, Ser. No. 60/217,960, filed on Jul. 13, 2000.

BACKGROUND OF THE INVENTION

More and more documents are being made accessible via computer networks. Whether in an intranet environment (accessible only within an organization) or on the Internet, the growth in the number of documents made available on-line has been significant. For example, it is now common for companies to provide annual reports on the Internet and/or intranet. J.P. Morgan & Co. Inc.'s (which, by its merger with The Chase Manhattan Corporation, is now J.P. Morgan Chase & Co.) 1999 annual report is presently available at the following Uniform Resource Locator ("URL"): http://www.jpmorgan.com/annual/. A user may choose to view the annual report on a display screen, or may choose to print out a hard copy of the annual report.

While the availability of documents on-line has greatly facilitated information exchange, research and retrieval, the inventors of the present invention have noticed that none of the on-line document retrieval systems known to the inventors allows a user to selectively customize a document for printing in a single batch process. Referring back to the annual report example above, a user of current on-line systems may print the entire document by selecting the PRINT function from the user interface. However, as is often the case, the user may only be interested in information contained in a portion of the report. If only certain pages of the document are desired for printing, the user may view and print the desired pages individually.

As the number of individual pages desired by the user grows, however, viewing and printing each page individually can become onerous and time-consuming. The alternative is to print the entire document and discard those pages not desired by the user. In either case, there is inefficiency and waste of resources.

What is desired, therefore, is an on-line document retrieval system which addresses the disadvantages described above of existing on-line document retrieval systems.

SUMMARY OF THE INVENTION

The objects of the invention are achieved by methods and system for allowing a user, through a user computer in telecommunication link with a system having access to electronic documents, to select pages of an electronic document for printing in a single batch process. One method includes providing a user interface having a first user selectable element and a second user selectable element; displaying to the user, through the user interface, the pages of an electronic document; allowing the user, via the first user selectable element, to select individual pages of the document desired for printing in a single batch process; storing the user selected page information in response to user activation of the first user selectable element; allowing the user, via the second user selectable element, to print in a single batch process the pages of the document that the user has selected for printing in a single batch process; and retrieving, in response to user activation of the second user selectable element, the stored user selected pages information for printing of those pages of the document selected by the user.

BRIEF DESCRIPTION OF THE DRAWINGS

FIGS. 3a–3k show some of the pages of J.P. Morgan's 1999 annual report;

FIGS. 4a–4d correspond to FIGS. 3a, 3f, 3h and 3k, respectively, and show an embodiment of a user interface provided by the system of FIG. 1;

FIG. 5 shows one embodiment of a user interface provided by the system of FIG. 1 when a view list of pages selected interactive button from the user interface of FIGS. 4a–4d is selected; and FIGS. 6a–6g show the customized report generated when a user adds the document pages shown in FIGS. 4a–4d.

DESCRIPTION OF THE INVENTION

Figure 1:
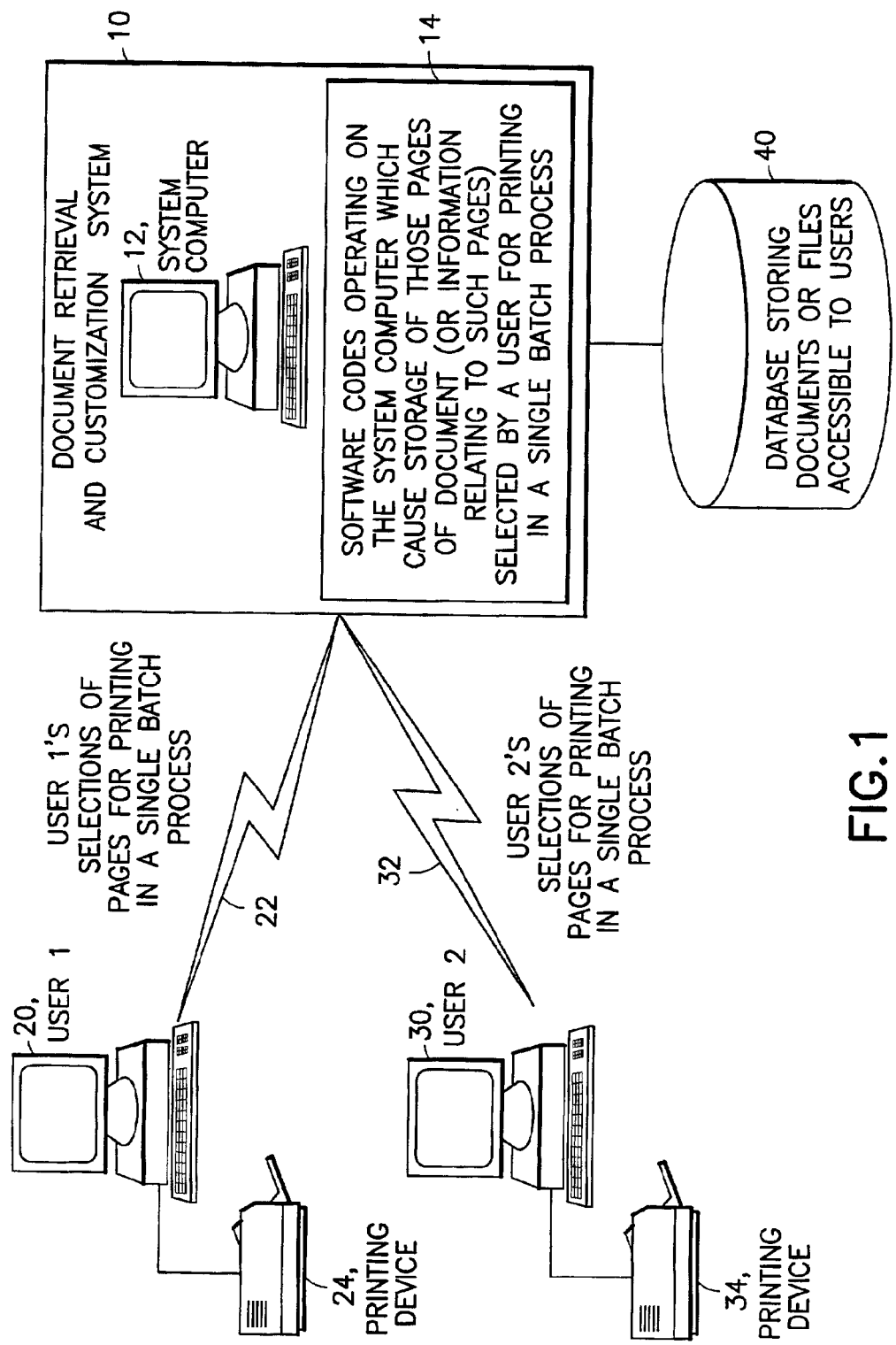
FIG. 1 shows an embodiment of a document retrieval and customization system of the present invention.

FIG. 1 shows an embodiment of a document retrieval and customization system 10 of the present invention. The system 10 is in telecommunication link 22 with a first user computer 20 and in telecommunication link 32 with a second user computer 30. The telecommunication links 22, 32 may be over a local area network ("LAN") or an Internet connection using a public switched telephone network or a cable network. Connections may also be provided by dedicated data lines, cellular, Personal Communication Systems ("PCS"), microwave, satellite networks, or other means known in the art. While FIG. 1 shows the first and second user computers 20, 30 separately linked to the system 10, it should be apparent to one of ordinary skill in the art that if the first and second user computers are part of the same LAN or the like, then both user computers can be linked to the system 10 by a common telecommunication link.

The first user computer 20 is electronically connected to a first printing device 24. The second user computer 30 is electronically connected to a second printing device 34. While the first and second user computers 20, 30 are shown in FIG. 1 connected to separate printing devices, it should be apparent to one of ordinary skill in the art that both user computers can be connected to a common printing device (e.g., where both computers are part of the same LAN or the like). Also, it should be apparent to one of ordinary skill in the art that while FIG. 1 shows two user computers connected to the system 10, the number of user computers that may be connected to the system 10 is not so limited.

The document retrieval and customization system 10 includes a system computer 12. A storage unit, such as a database 40, which stores documents is electronically connected to the system 10. As will be described in greater detail below, software codes 14 executing on a microprocessor (not shown) of the system computer 12 cause storage of those pages of document (or information relating to such pages) selected by a user for printing in a single batch process. It should be noted that the term "document" used herein is not to be limited, and includes any electronic file that can be displayed on a user computer.

Figure 2:
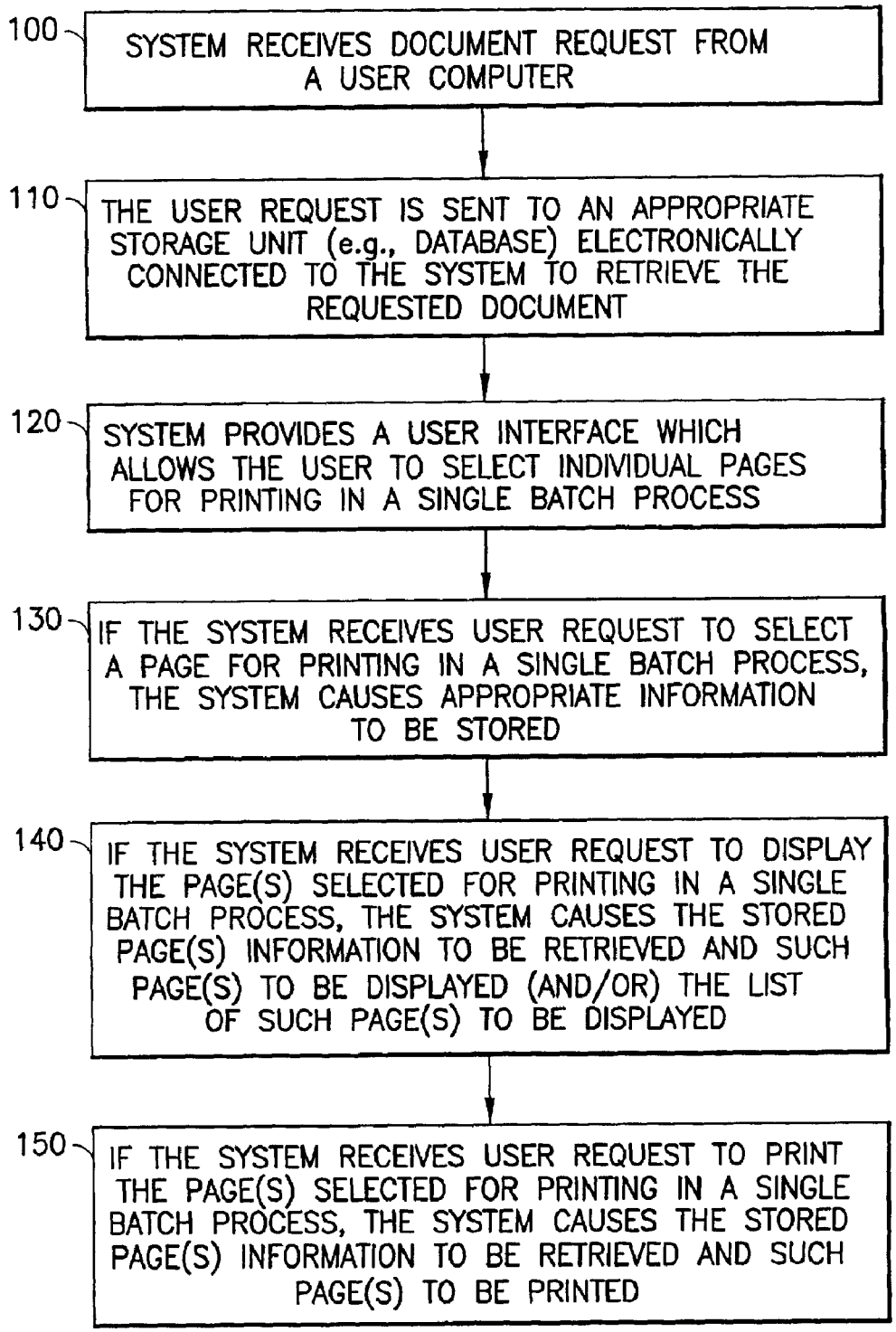
FIG. 2 shows an operation flowchart of the document retrieval and customization system of FIG. 1.

Operation of the embodiment of the document retrieval and customization system 10 of FIG. 1 is described in reference to FIG. 2. At step 100, the system receives a document request from a user computer. For example, let's assume that the database 40 stores a company's annual reports. The system 10, at step 100, may receive a request from the first user computer 20 over the telecommunication link 22 for the company's 1999 annual report. At step 110, the system sends the received user request to the storage unit to retrieve the requested document. Returning to our example, the system 10 sends the user request to the database 40 to retrieve the company's 1999 annual report.

The system provides a user interface which includes allowing the user to select individual pages of the retrieved document for printing in a single batch process. This is step 120 in FIG. 2. At step 130, if the system receives user request to select a page for printing in a single batch process, the system causes appropriate information (e.g., either the actual page or information relating to the page) to be stored. If the system receives user request to display the page(s) selected for printing in a single batch process, the system causes the stored page(s) information to be retrieved and such page(s) to be displayed (and/or the list of such page(s) to be displayed). This is step 140. At step 150, if the system receives user request to print the page(s) selected for printing in a single batch process, the system causes the stored page(s) information to be retrieved and such page(s) to be printed.

Going back to our example, let's assume that the user is interested in reviewing those pages of the 1999 annual report relating to the balance sheet, income statement and statement of cash flows. Through the interface provided by the system 10, the user, through his computer 20, can select these pages of the 1999 annual report for printing in a single batch process.

Figure 3B:
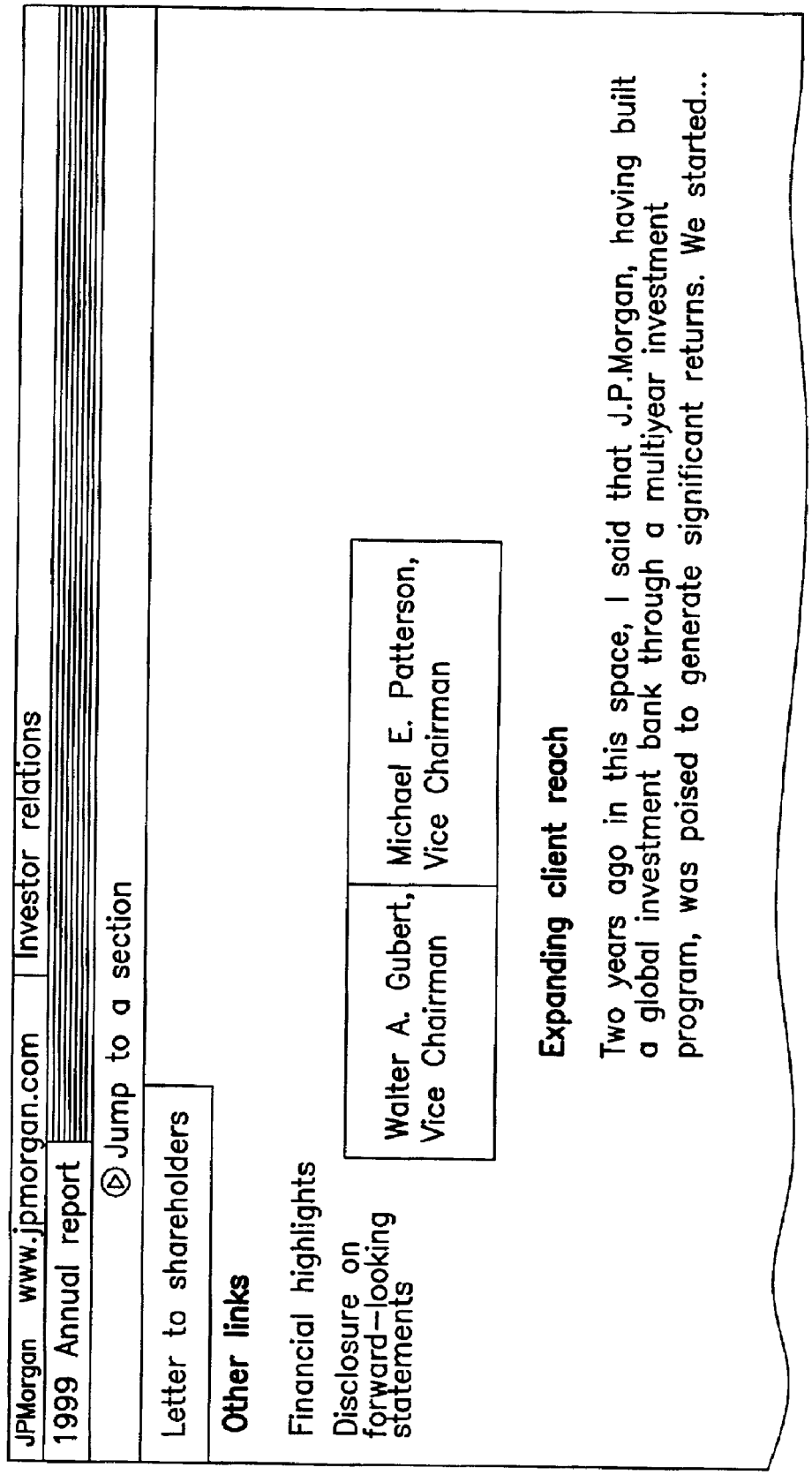

To further describe the page selection process in detail, we will refer to FIGS. 3*a*–3*k*, which show some of the pages of J.P. Morgan's 1999 annual report. Note that our selection of these 11 pages of the more than 100-page annual report is for illustrative purposes only. FIG. 3*a* shows the first page of the "Dear Fellow Shareholders" subsection under the section of the 1999 annual report entitled "Letter to Shareholders." FIG. 3*b* shows the first page of the "Expanding Client Reach" subsection under the Letter to Shareholders section. FIG. 3*c* shows the "Financial Highlights" subsection under the Letter to Shareholders section.

The next section of the 1999 annual report is entitled "Voices and Views," the first page of which is shown in FIG. 3*d*. FIG. 3*e* shows the first page of the "Review and Outlook" subsection under "Management's Discussion & Analysis" ("MD&A") section. FIG. 3*f* shows the first page of the "Investment Banking" sub-subsection of the "Business Segment Results" subsection under the MD&A section.

Figure 3J:
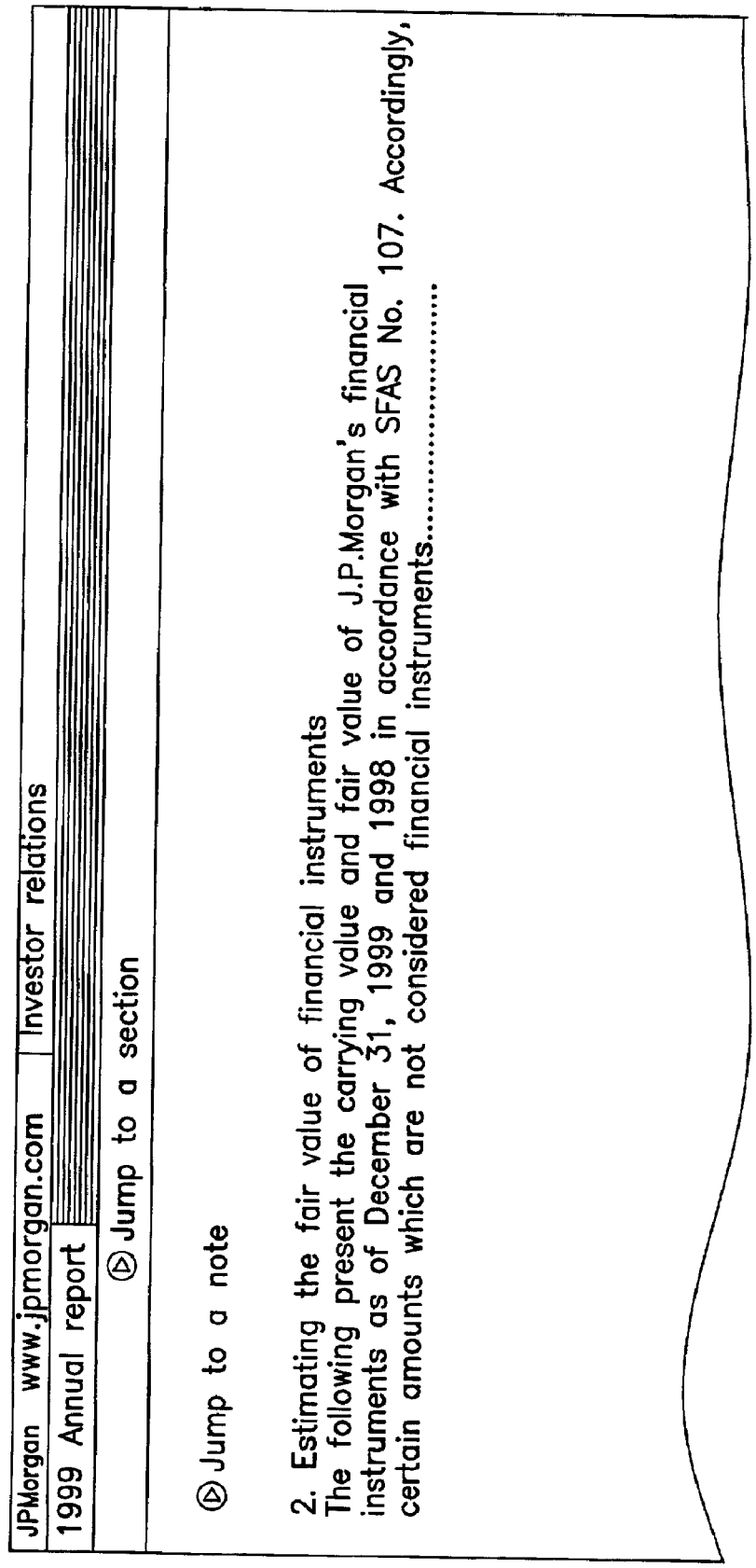
Figure 3K:
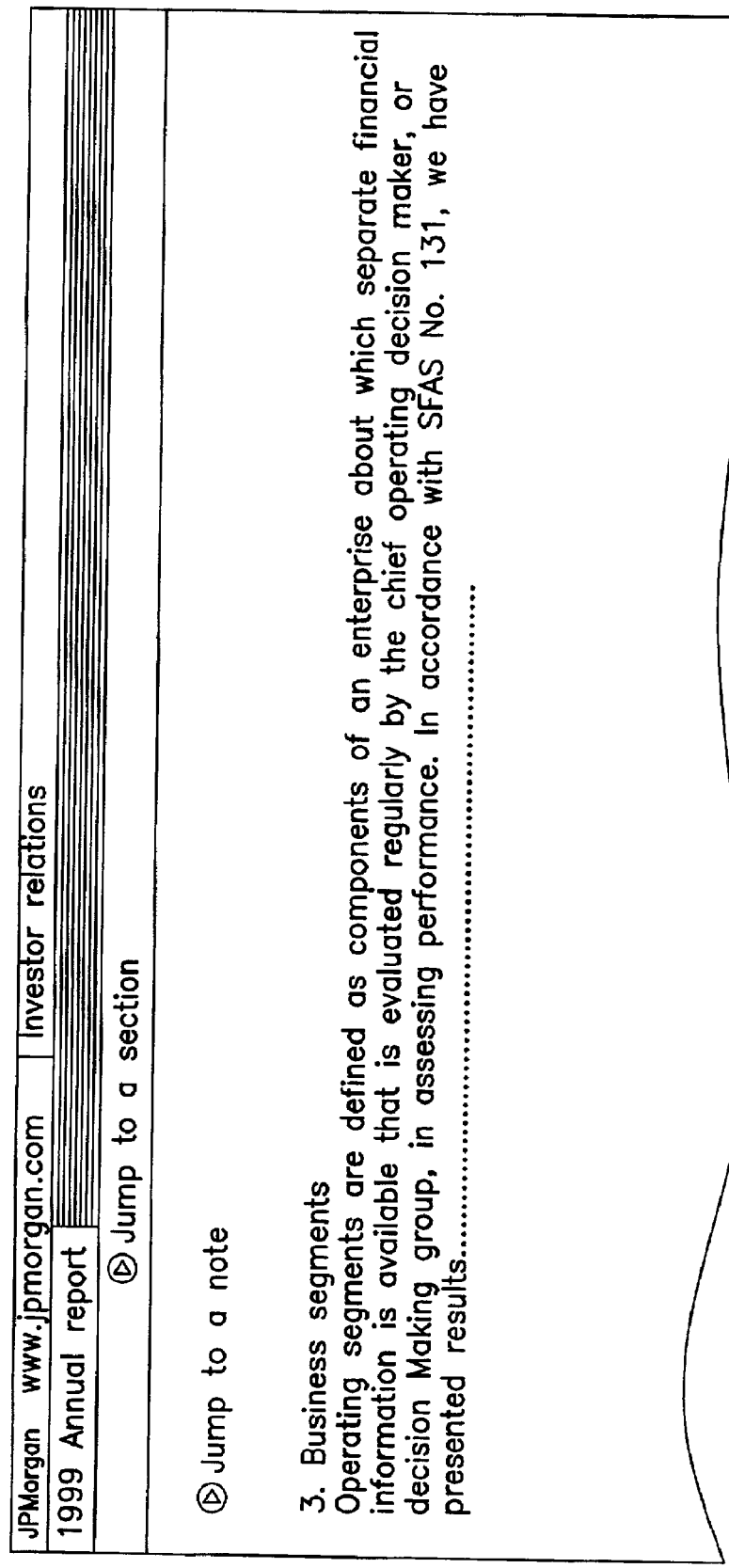

Following the MD&A section of the 1999 annual report is the "Consolidated Financial Statements" section, which is shown in FIG. 3*g*. FIG. 3*h* shows the "Consolidated Statement of Income" under the Consolidated Financial Statements section. FIG. 3*i* shows the first page of note 1 accompanying the Consolidated Statement of Income. FIG. 3*j* shows the first page of note 2 accompanying the Consolidated Statement of Income. And FIG. 3*k* shows the first page of note 3 accompanying the Consolidated Statement of Income.

Let's assume that the 1999 J.P. Morgan annual report is stored in the storage unit 40 of FIG. 1. Let's further assume that an on-line user, such as user of the second computer 20 of FIG. 1, is only interested in printing the following portions of J.P. Morgan's 1999 annual report: the Dear Fellow Shareholders subsection of the Letter to Shareholders section; the Investment Banking sub-subsection of the Business Segment Results subsection under the MD&A section; the Consolidated Statement of Income under the Consolidated Financial Statements section; and note 3 accompanying the Consolidated Statement of Income. The system 10 provides an appropriate user interface to allow the user to select these desired portions of the 1999 annual report for printing in a single batch process.

Referring to FIGS. 4*a*–4*d*, there is shown one embodiment of the user interface provided by the document retrieval and customization system of FIG. 1. The user interface 200 displays the document that the user has selected to display, J.P. Morgan's 1999 annual report in this case. The user interface 200 also provides a first user selectable element 210, a second user selectable element 220 and a third user selectable element 230. Preferably, these user selectable elements are provided with each page of the displayed document.

The first user selectable element 210, when selected by the user, adds the corresponding page of the document to a list of pages selected by the user for printing in a single batch process. Preferably, after the user has added the page, the text associated with the first user selectable element 210 will change to reflect that the page has been added (e.g., by stating "Page Added"). Further, it is preferred that after the user has added the page, the text accompanying the first user selectable element 210 will show "Delete Page" or the like when the user rolls a computer mouse over it. By re-selecting the first user selectable element 210, the user can remove the added page from the list of pages selected by the user for printing in a single batch process. It should be noted that while this embodiment of the invention shows user selectable elements that are activated using the computer mouse, other user input means known in the art may also be employed without departing from the invention, such as touch-screen or voice recognition.

The second user selectable element 220, when selected by the user, provides information in a tutorial or similar format to answer user questions. Such information may be stored in a storage unit (not shown) of the document retrieval and customization system 10 or a database electronically connected to the system 10. The third user selectable element 230, when selected by the user, allows the user to view the list of pages selected for printing in a single batch process. For example, FIG. 5 shows one embodiment of a user interface displayed when the third user selectable element 230 is selected.

In FIG. 5, the user interface 300 shows the list of pages of a document selected by a user. Next to each selected page on the list, there is shown a user selectable element 310 which allows the user to confirm the inclusion of the page for printing in a single batch process. By selecting the user selectable element 310, the user can effectively remove the page from the list of user selected pages. This user selectable element 310, while shown in FIG. 5, is optional to the user interface 300. Next to each selected page on the list, there is also shown a user selectable element 320 which allows the user to view the selected page. This user selectable element 320, while preferably included in the user interface 300, is also optional. Another user selectable element 330 allows the user, by its selection, to create the "report" (i.e., generate a document having only the user selected pages). The document retrieval and customization system 10 may cause the report to be printed as it is being created after user activation of selectable element 330. Or in the alternative, the system 10 may provide another user selectable element after the creation of the report, the activation of which would print the report in a single batch process.

While the descriptions above refer to user selection of individual pages of a document, the system 10 may be modified to allow user selection of individual subsections or sections of a document. For example, referring back to the J.P. Morgan 1999 annual report of FIGS. 3a–3k, the system 10 may be designed to provide user selection of individual subsections or sections for printing in a single batch process, e.g., the Financial Highlights subsection under the Letter to Shareholders section and the MD&A section. This option of allowing the user to select individual subsections or sections of a document may be provided along with the option of allowing the user to select individual pages of the document.

User selections are preferably stored in a cookie in the user's computer and/or in a session object in the system 10. It should be remembered that world wide web browsers typically provide to users the option of not allowing cookies to be placed in the users' computers. Therefore, it is highly desirable to ensure that user selections are not only saved in cookies.

Figure 4B:
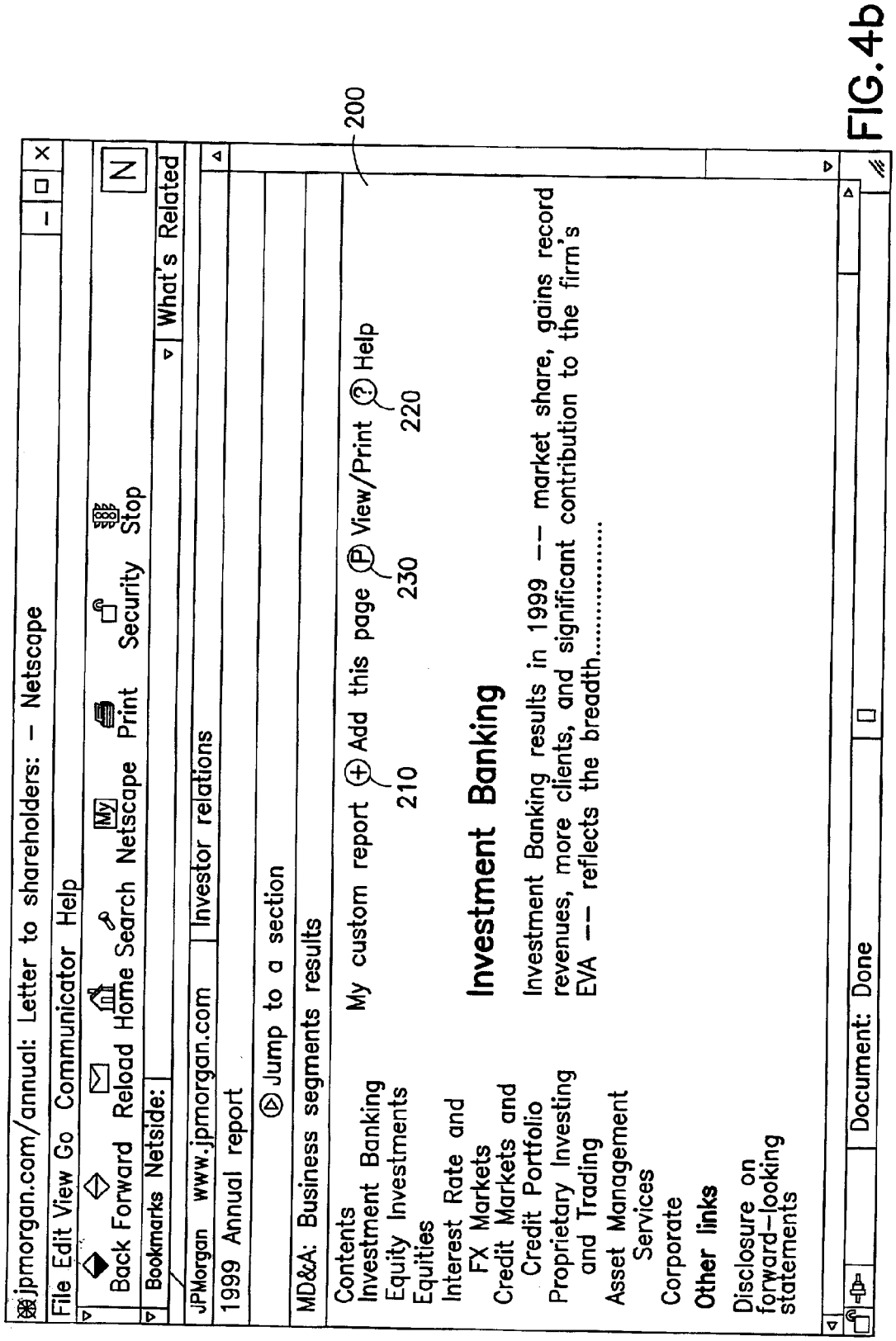
Figure 4C:
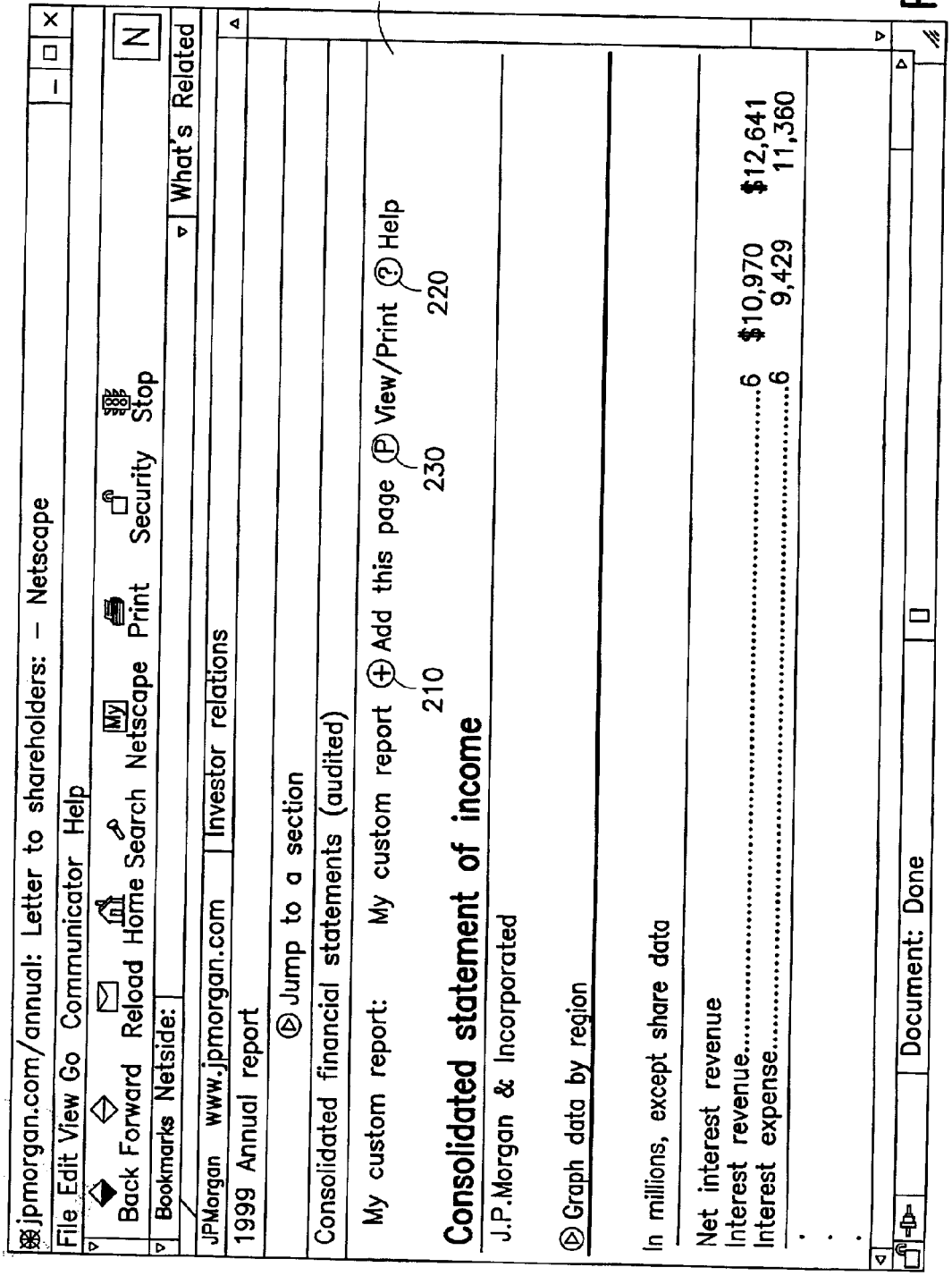
Figure 4D:
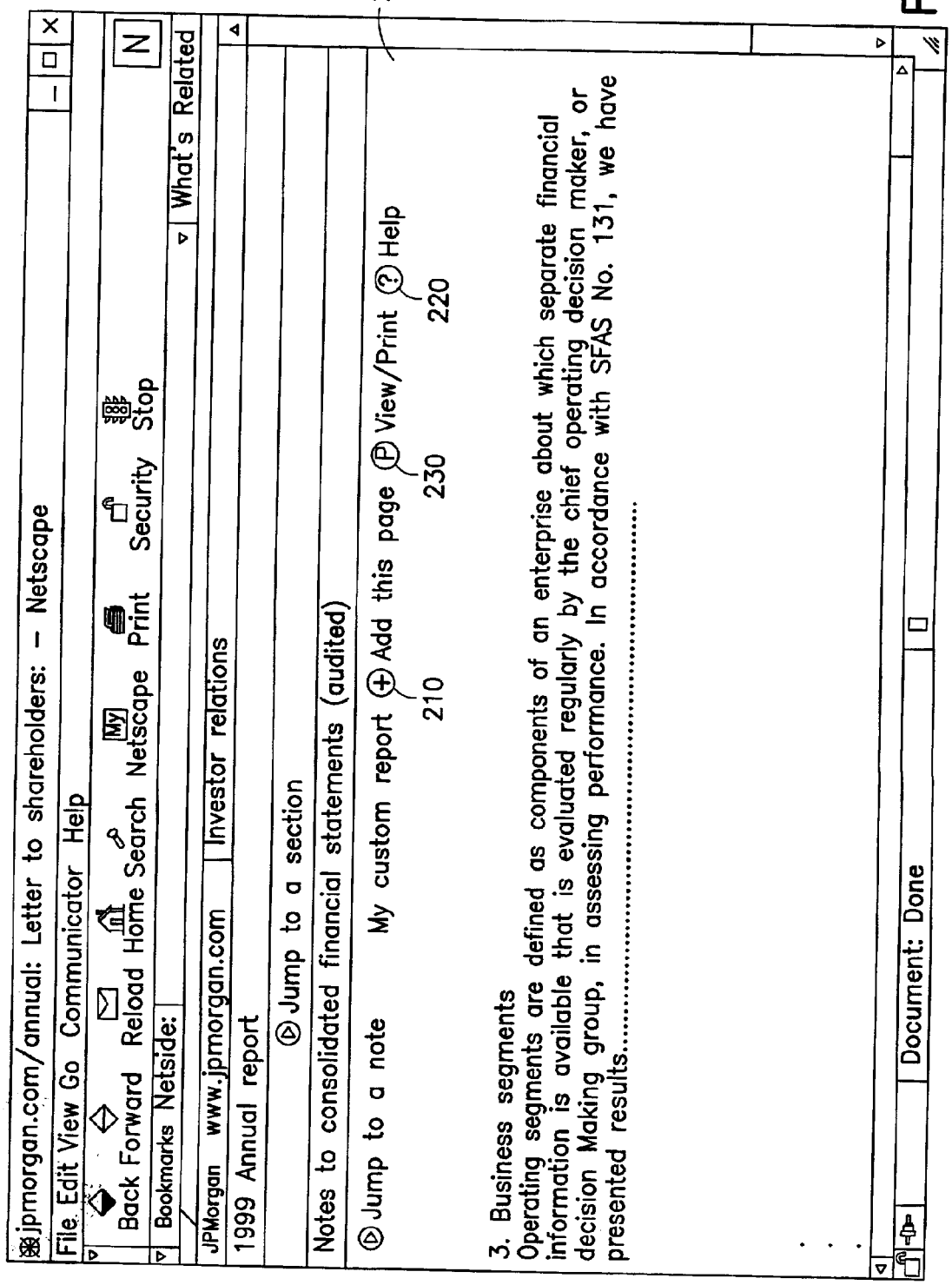

Referring back to FIGS. 4a–4d, FIG. 4a shows the first page of the Dear Fellow Shareholders subsection under the Letter to Shareholders section. FIG. 4b shows the first page of the Investment Banking sub-subsection of the Business Segment Results subsection under the MD&A section. FIG. 4c shows the Consolidated Statement of Income under the Consolidated Financial Statements section. And FIG. 4d shows the first page of note 3 accompanying the Consolidated Statement of Income. If the user selects all of these and related pages by activating the first user selectable element 210, then the report created from the selected pages by activating user selectable element 330 (FIG. 5) is shown in FIGS. 6a–6g.

FIG. 6a shows the Dear Fellow Shareholders subsection of the 1999 J.P. Morgan annual report. FIGS. 6b–6c show the Investment Banking sub-subsection under the MD&A section. FIG. 6d shows the Consolidated Statement of Income. FIGS. 6e–6g show note 3 accompanying the Consolidated Statement of Income. While it is not shown in the figures, the system 10 may be designed to provide a cover page and/or table of contents and/or references in the customized report reflecting the page selections made by the user.

The present invention contemplates the use of personal computers or the like by users employing typically available technological resources, such as cookies (described above) and web browsers (e.g., Netscape Navigator or Microsoft Internet Explorer) that are capable of displaying documents having dynamic and/or static textual and/or graphical components in such standard formats as Hyper Text Markup Language ("HTML"), Dynamic HTML or Extensible Markup Language ("XML"). The document retrieval and customization system 10 preferably works in conjunction with the following technological resources:

A document base where document source files are in a standard extensible format, such as HTML, XML, Java Server Pages ("JSP") and/or Active Server Pages ("ASP"), allowing content providers to include informational tags about each document source and to insert executable constructs (statements) into source files for interactive custom report controls as user selectable elements, e.g., the user selectable elements 210, 220, 230 of FIGS. 4a–4d.

A source-to-display converter which processes the entire document base to (i) convert document source files to displayable output files with a user interface, such as the user interface 200 with the user selectable elements 210, 220, 230 of FIGS. 4a–4d, and (ii) generate a meta-table outlining the structure of the entire document base. Note that meta information is used to help parse a web page, but it is not displayed as part of the user interface 200 by the browser.

A page server engine which processes an on-line user's custom report cookie, maintains session information, generates pages according to the user's cookie and session information, and executes the user's command coming from the document pages displayed on the user's computer. Such a page server engine may be responsible for performing the steps 100 through 130 of FIG. 2.

A set of display-to-print translators which either retrieves a printable document page corresponding to a selected displayable page from the pre-defined static document base or creates those that correspond to interactive dynamic pages on the fly. Such display-to-print translators may perform step 140 of FIG. 2.

A custom report generator which creates a printable custom report in a target print format, such as Portable Document Format ("PDF"), HTML or Graphics Interchange Format ("GIF"), by extracting page selections from an on-line user's custom report cookie and session information, and concatenating printable document pages into a single batch which also includes appropriate additions such as a cover page, table of contents and references. Such custom report generator may perform step 150 of FIG. 2.

Those skilled in the art will recognize that the method and system of the present invention is not limited to the representative examples disclosed herein. Moreover, the scope of the present invention covers conventionally known variations and modifications to the methods and system components described herein, as would be known by those skilled in the art.

What is claimed is:

1. A method for allowing a user, through a computer in telecommunication link with a system having access to electronic documents, to select pages of an electronic document for printing in a single batch process, which comprises:

providing a user interface having a first user selectable element and a second user selectable element;

displaying to the user, through the user interface, the pages of an electronic document;

allowing the user, via the first user selectable element, to select individual pages of the document desired for printing in a single batch process;

storing the user selected page information in response to user activation of the first user selectable element;

allowing the user, via the second user selectable element, to print in a single batch process the pages of the document that the user has selected for printing in a single batch process; and retrieving, in response to user activation of the second user selectable element, the stored user selected pages information for printing of those pages of the document selected by the user.

2. The method of claim 1 which further comprises providing the user interface having a third user selectable element which allows the user, via its selection, to view the pages of the document that the user has selected for printing in a single batch process.

3. The method of claim 1, wherein the first user selectable element, after activation by the user to select a page of the document, may again be activated by the user to de-select selected page of the document.

4. The method of claim 1, which further comprises generating a cover page, in response to user activation of the second user selectable element, listing the pages of the document selected by the user.

5. The method of claim 4, wherein the cover page provides a user selectable element which allows the user to de-select a selected page of the document.

6. In a system having access to electronic documents, the system being in telecommunication link with at least one user computer, a method for allowing a user of a user computer to access an electronic document and to select desired pages of the document for printing in a single batch process, which comprises:
providing a user interface having a first user selectable element and a second user selectable element;
displaying to the user, through the user interface, the pages of the document accessed by the user;
determining whether the user has selected the first user selectable element;
if the first user selectable element has been selected, then storing the displayed page of the document;
determining whether the user has selected the second user selectable element;
if the second user selectable element has been selected, then retrieving the stored pages of the document; and
effectuating the printing in a single batch process of the stored pages of the document.

7. The method of claim 6, which further comprises displaying a list of the stored pages of the document if the second user selectable element has been selected.

8. The method of claim 6, which further comprises:
determining whether the user has re-selected the first user selectable element after selecting the first user selectable element; and
if the first user selectable element has been re-selected, then removing from storage the displayed page of the document.

9. The method of claim 6, which further comprises:
generating a cover page that includes information relating to the stored pages of the document if the second user selectable element has been selected; and
effectuating the printing of the cover page with the stored pages of the document in a single batch process.

10. The method of claim 9, wherein the cover page provides a user selectable element corresponding to each stored page of the document, and if a user selectable element of the cover page is selected by the user, then the corresponding stored page of the document is removed from storage.

11. A system having access to electronic documents stored in a storage unit and being in telecommunication link with at least one user computer, which comprises:
a system computer having a microprocessor, the system computer providing a user interface capable of displaying pages of a document to a user computer;
a first set of software codes executing on the microprocessor, the first set of software codes providing a first user selectable element and a second user selectable element to the user interface;
if the system computer receives from the user computer an electronic signal that the first user selectable element has been selected, then a second set of software codes executing on the microprocessor cause the document page displayed on the user interface when the first user selectable element was selected to be stored; and
if the system computer receives from the user computer an electronic signal that the second user selectable element has been selected, then a third set of software codes executing on the microprocessor cause the document pages stored in response to selection of the first user selectable element to be retrieved for printing in a single batch process.

12. The system of claim 11, wherein the second set of software codes and the third set of software codes are part of the same set of software codes.

13. The system of claim 11, wherein:
the first set of software codes provides a third user selectable element; and
if the system computer receives from the user computer an electronic signal that the third user selectable element has been selected, then a fourth set of software codes executing on the microprocessor cause a cover page listing the stored document pages to be generated and displayed on the user computer.

14. The system of claim 13, wherein the third set of software codes and the fourth set of software codes are part of the same set of software codes.

15. The system of claim 11, wherein the selected document pages are stored as a cookie on the user computer.

16. The system of claim 11, wherein the selected document pages are stored in a session log file in the system computer.

17. The system of claim 11, wherein the electronic documents accessible to the system computer have source files in extensible format.

18. The system of claim 17, wherein the first set of software codes converts the document's source files to displayable output files and generates a meta-table which includes the structure of the document.

19. In a system having access to electronic documents, the system being in telecommunication link with at least one user computer, a method for allowing a user of a user computer to access an electronic document and to select desired pages of the document for printing in a single batch process, which comprises:
providing a user interface having a first user selectable element and a second user selectable element;
displaying to the user, through the user interface, the pages of the document accessed by the user;
determining whether the user has selected the first user selectable element;
if the first user selectable element has been selected, then marking the displayed page of the document as being selected;
determining whether the user has selected the second user selectable element;
if the second user selectable element has been selected, then retrieving the marked pages of the document; and
effectuating the printing in a single batch process of the marked pages of the document.

20. The method of claim 19, which further comprises displaying a list of the marked pages of the document if the second user selectable element has been selected.

21. The method of claim 19, which further comprises:
determining whether the user has re-selected the first user selectable element after selecting the first user selectable element; and
if the first user selectable element has been re-selected, then unmarking the displayed page of the document.

22. The method of claim 19, which further comprises:
generating a cover page that includes information relating to the stored pages of the document if the second user selectable element has been selected; and effectuating the printing of the cover page with the marked pages of the document in a single batch process.

23. The method of claim 22, wherein the cover page provides a user selectable element corresponding to each marked page of the document, and if a user selectable element of the cover page is selected by the user, then the corresponding marked page of the document is unmarked.

* * * * *